(12) United States Patent
Fite

(10) Patent No.: US 8,419,367 B2
(45) Date of Patent: Apr. 16, 2013

(54) VERTICAL-AXIS TURBINE FOR CAPTURING THE FORCE OF MOVING GASES OR LIQUIDS AND A METHOD FOR ITS USE

(76) Inventor: David L. Fite, Mount Orab, OH (US)

( * ) Notice: Subject to any disclaimer, the term of this patent is extended or adjusted under 35 U.S.C. 154(b) by 1103 days.

(21) Appl. No.: 12/135,885

(22) Filed: Jun. 9, 2008

(65) Prior Publication Data

US 2008/0304968 A1 Dec. 11, 2008

Related U.S. Application Data

(60) Provisional application No. 60/942,714, filed on Jun. 8, 2007.

(51) Int. Cl.
*F03D 1/00* (2006.01)

(52) U.S. Cl. .................. 416/119; 416/204 R

(58) Field of Classification Search .............. 416/119, 416/220 R
See application file for complete search history.

(56) References Cited

U.S. PATENT DOCUMENTS

| | | | |
|---|---|---|---|
| 4,843 A | 11/1846 | Rowand | |
| 113,284 A * | 4/1871 | Folsom | 416/119 |
| 195,114 A | 9/1877 | Folson | |
| 786,297 A | 4/1905 | Kenworthy | |
| 1,096,057 A * | 5/1914 | Rees | 415/4.4 |
| 1,109,839 A | 9/1914 | Henry | |
| 1,808,874 A * | 6/1931 | Wilson | 415/4.4 |
| 1,812,741 A * | 6/1931 | Espinosa | 415/4.4 |
| 3,895,882 A * | 7/1975 | Moyer | 415/4.4 |
| 3,976,396 A * | 8/1976 | Antogini | 416/119 |
| 4,086,023 A * | 4/1978 | Morgan | 416/132 B |
| 4,127,356 A | 11/1978 | Murphy | |
| 4,288,200 A * | 9/1981 | O'Hare | 415/4.4 |
| 4,383,797 A | 5/1983 | Lee | |
| 4,776,762 A * | 10/1988 | Blowers, Sr. | 416/119 |
| 4,822,239 A * | 4/1989 | Tsipov | 415/125 |
| 5,051,059 A * | 9/1991 | Rademacher | 415/7 |
| 6,006,518 A * | 12/1999 | Geary | 60/398 |
| 6,242,818 B1 | 6/2001 | Smedley | |
| 6,499,939 B2 * | 12/2002 | Downing | 415/3.1 |
| 6,984,899 B1 | 1/2006 | Rice | |
| 7,083,382 B2 * | 8/2006 | Ursua | 416/110 |
| 7,189,050 B2 | 3/2007 | Taylor | |
| 2003/0235498 A1* | 12/2003 | Boatner | 416/119 |
| 2006/0140765 A1* | 6/2006 | Shih | 416/132 B |

* cited by examiner

*Primary Examiner* — Harry W Byrne
(74) *Attorney, Agent, or Firm* — Shawn R. Farmer; Muskin & Cusick, LLC

(57) ABSTRACT

A vertical-axis turbine is provided, which comprises two or more arc-shaped blades which can pivot so as to decrease drag and maximize the force collected by each blade from moving gas or liquid. These arc-shaped blades can also be capable of directing moving gas or liquid from one blade to another. Additionally, these blades can comprise thin strips along their outer edge, which can increase their strength and rigidity as well as increase the amount of force captured by each blade from the moving gas or liquid.

16 Claims, 7 Drawing Sheets

VERTICAL-AXIS TURBINE FOR CAPTURING THE FORCE OF MOVING GASES OR LIQUIDS AND A METHOD FOR ITS USE

CROSS REFERENCE TO RELATED APPLICATIONS

This application claims benefit to provisional application No. 60/942,714, which is incorporated by reference herein in its entirety.

FIELD OF THE INVENTION

The present device is a turbine comprising hinged blades pivotally attached parallel to a vertical axis. This vertical-axis turbine is designed to maximize the power transfer from moving gas or liquid on one side of its axis while minimizing the drag from that same gas or liquid on the other side of its axis. Additionally, the blades are formed in such a way as to direct moving gas or liquid away from the drag-creating side of the axis and toward the power-transferring side of the axis.

Background

As concerns about global warming and rising fuel costs have increased in recent times, people have turned to alternative sources of energy that are relatively free from these concerns. Two of the most widely used alternative sources of energy are wind and water powered turbines. These devices are regularly used to produce electricity without the use of expensive fossil fuels, and therefore, without releasing any carbon dioxide into the atmosphere, which is believed to contribute to global warming.

Devices that capture wind, steam and water power have existed for centuries in a variety of forms. One of these forms is a so-called "vertical-axis turbine" which is comprised of one or more rotor shafts aligned vertically, which are rotated by forces acting upon blades attached to each vertically-aligned rotor shaft. Many varieties of vertical-axis turbines exist in the prior art, particularly in the field of wind turbines. (See U.S. Pat. No. 786,297 for an example of a vertical-axis turbine.) One problem common to these types of turbines is that while blades on one side of the vertical axis are capturing the force of moving gases or liquids, the blades on the other side must rotate into the moving gas or liquid creating a great deal of drag, thereby reducing their efficiency. Two different approaches have been used to overcome this obstacle. Many vertical-axis turbine designs comprise moving blades, which attempt to reduce drag when the blades must rotate into the wind, by altering their position to a more aerodynamic state. (See U.S. Pat. No. 7,083,382 for an example.) Other designs attempt to direct gas or liquid into the blades accepting the force of the flowing gas or liquid, often by the use of a funnel, and away from the blades rotating against the direction of the flow. (See U.S. Pat. No. 4,127,356 for an example.)

What is needed is a vertical-axis turbine which has the capacity to both pivot its blades to reduce drag while also being able to direct moving gas or liquid away from the blades rotating into the direction of the flow and into the blades accepting the force of the wind or liquid.

Summary Of The Invention

It is an aspect of the present inventive concept to provide for an improved turbine for use with gas and liquid.

The above aspect can be obtained by a vertical-axis turbine apparatus comprising a rotatable shaft, mounted vertically with relation to the ground and having first end and a second end, a substantially flat plate connected to the first end of the rotatable shaft, two or more arc-shaped blades each having a first end and a second end and a concave side and convex side, wherein the first end of each blade is pivotally attached perpendicular to the plate by a hinge, wherein each blade is capable of radial movement about the hinge, wherein the concave side of a first arc-shaped blade is capable of receiving the force of passing liquid or gas, while the convex side of a second arc-shaped blade is capable of deflecting passing liquid or wind into said concave side of the first arc-shaped blade, a first stop is connected to the substantially flat plate and located slightly behind the hinge, and behind the arc-shaped blade and is capable of restricting the radial movement of the blade, and a second stop connected to the plate and located in front of the first pin and in front of the blade, which is capable of restricting the radial movement of the blade.

The above aspect can also be obtained by a vertical-axis turbine apparatus comprising a rotatable shaft, mounted vertically with relation to the ground and having first end and a second end a substantially flat first plate connected to the first end of the rotatable shaft and a substantially flat second plate attached to a middle of the rotatable shaft near its first end, two or more arc-shaped blades each having a first end and a second end and a concave side and convex side, wherein the first end of each blade is pivotally attached perpendicular to both substantially flat plates by one or more hinges, wherein each blade is capable of radial movement about these hinges, wherein the concave side of a first arc-shaped blade is capable of receiving the force of passing liquid or gas, while the convex side of a second arc-shaped blade is capable of deflecting passing liquid or gas into said concave side of the first arc-shaped blade, a first stop is connected to both substantially flat plates and located slightly behind the hinge, and behind the arc-shaped blade and is capable of restricting the radial movement of the blade, and a second stop connected to both substantially flat plates and located in front of the first pin and in front of the blade, which is capable of restricting the radial movement of the blade.

The above aspect can also be obtained by a method for capturing the force of moving gases or liquid comprising the use of a vertical-axis turbine apparatus, the apparatus having a rotatable shaft, mounted vertically with relation to the ground and having first end and a second end, a substantially flat plate connected to the first end of the rotatable shaft, two or more arc-shaped blades each having a first end and a second end and a concave side and convex side, wherein the first end of each blade is pivotally attached perpendicular to the plate by a hinge, wherein each blade is capable of radial movement about the hinge, wherein the concave side of a first arc-shaped blade is capable of receiving the force of passing liquid or gas, while the convex side of a second arc-shaped blade is capable of deflecting passing liquid or wind into said concave side of the first arc-shaped blade, a first stop is connected to the substantially flat plate and located slightly behind the hinge, and behind the arc-shaped blade and is capable of restricting the radial movement of the blade, a second stop connected to the plate and located in front of the first pin and in front of the blade, which is capable of restricting the radial movement of the blade, and the force of the moving gas or liquid is captured by the blades and transferred to the plate then to a pulley or rotatable shaft where it can be used to perform work.

These, together with other aspects and advantages, which will subsequently become apparent, and reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
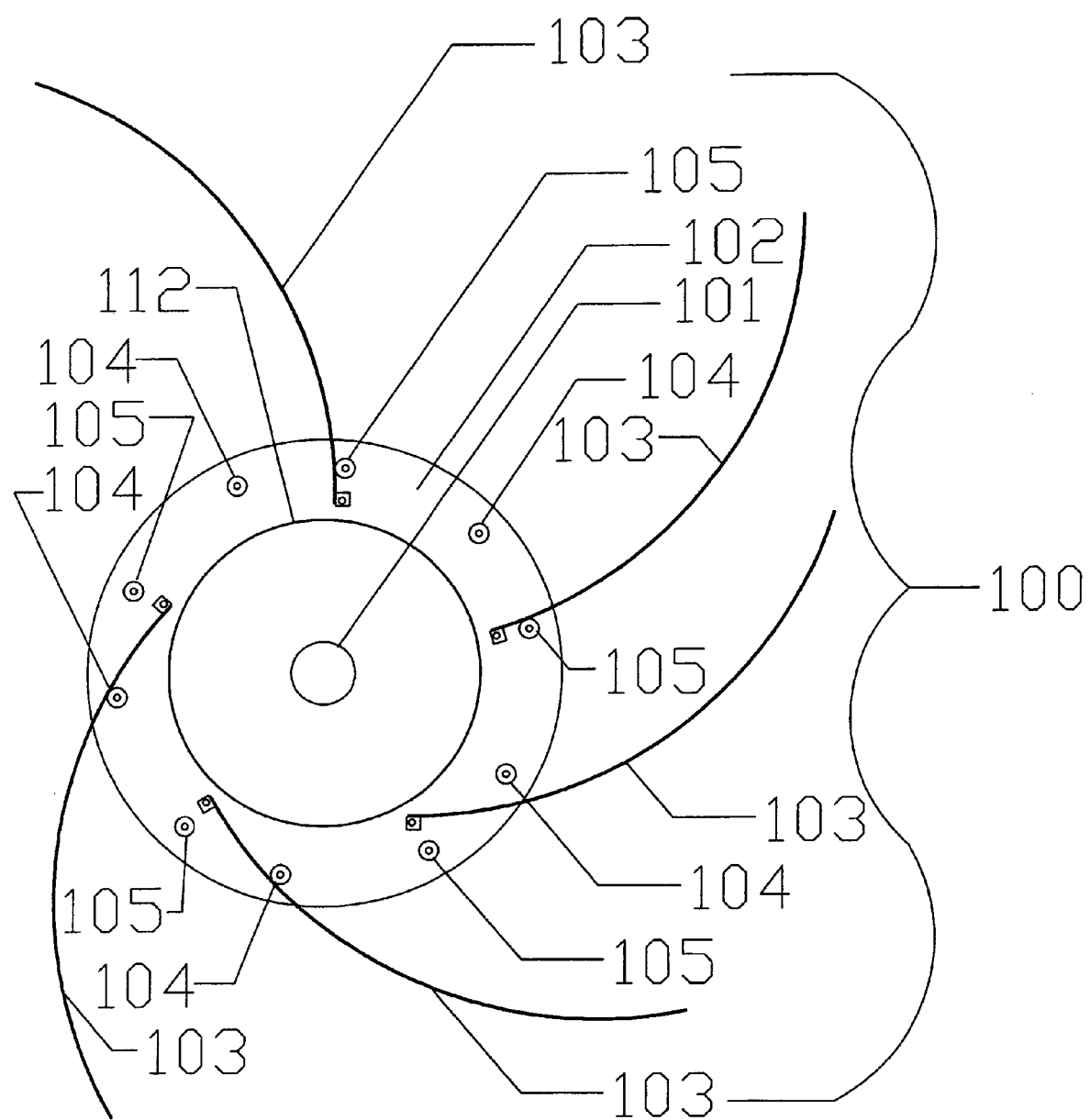
FIG. 1 is a top, cut-away view of a vertical-axis turbine, according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

FIG. 1 is a top, cut-away view of a vertical-axis turbine 100, according to an embodiment.

The vertical-axis turbine 100, as depicted in FIG. 1, can be comprised of five arc-shaped blades 103, each further comprising a concave side capable of receiving moving gas or liquid and a convex side capable of deflecting moving gas or liquid. Each blade can also have a first end and a second end where the second end can be pivotally attached to a first plate 102 and a second plate (not pictured). Both the first plate 102 and the second plate can be connected perpendicularly to a rotatable shaft 101 capable of both supporting the plates and transferring the force of the moving gas or liquid (not pictured) captured by the blades 103 and transferred to the first plate 102 and the second plate.

The vertical-axis wind turbine 100 can also comprise a first stop 104 connected perpendicularly to the plate 102 and located on one side of a blade 103 and a second stop 105 which can also be connected perpendicularly to the plate 102 and located on the other side of the blade 103. The first stop 104 can be capable of limiting the movement of the blade 103 in a first direction. The second stop 105 can be capable of both limiting the movement of the blade 103 in a second direction and transferring the force captured by the blade 103 to the plate 102. The first stops 104 and second stops 105 can also be capable of supporting the top plate (not pictured) by connecting it to the bottom plate 102. The first stops 104 and the second stops 105 can be comprised of cylindrical pins made from metal, wood, plastic or some other suitable material known in the art.

Additionally, the first stops 104 and the second stops 105 can comprise a shock absorbing sleeve (not pictured), made from rubber or some other suitable material. The purpose of this sleeve would be to both protect the blades 103 and stops (104 and 105) from wear and reduce the amount of noise created by the vertical-axis wind turbine 100.

The vertical-axis wind turbine 100 can also comprise a tube-shaped center 112 which can have a diameter located just inside of the position where each blade 103 is pivotally connected to the plate 102. This tube-shaped center 112 can be used to deflect wind away from the center of the turbine 100 and toward the blades 103, thereby reducing drag and improving efficiency.

Figure 2:
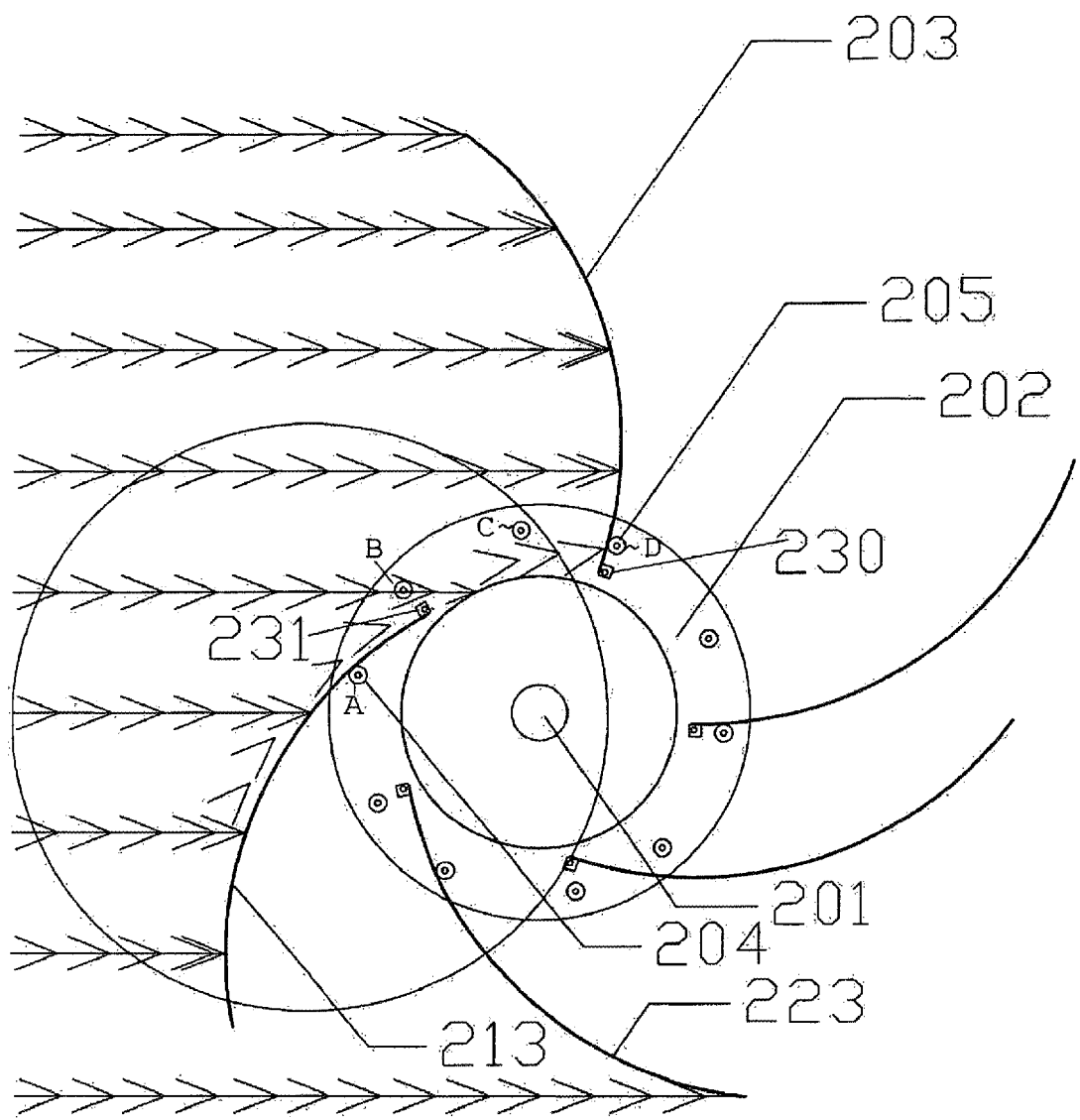
FIG. 2 is a top, cut-away view of a vertical-axis turbine wherein the motion of gas or liquid is indicated by arrows, according to an embodiment.

FIG. 2 is a top, cut-away view of a vertical-axis turbine wherein the motion of gas or liquid is indicated by arrows, according to an embodiment.

The vertical-axis turbine 200 can be configured to rotate in a clockwise direction as pictured. (Note, however, that the vertical axis turbine 200 can also be configured in such a way that its rotation is counter-clockwise.) This rotation can be actuated when the force of moving gas or liquid (indicated by arrows) is captured by an arc-shaped blade 203 in an open configuration, which is roughly perpendicular to the direction of the flowing gas or liquid. The force captured by this blade 203 in an open configuration is transferred to one or more plates 202 and then to the rotatable shaft 201 when the blade 203 pivots against a second stop 205. The second stop 205 momentarily locks the blade 203 in place preventing it from pivoting further in relation to the plate 202. In this way a blade 203 on one side of the vertical-axis turbine 200 can capture the force of moving gas or liquid (indicated by arrows) by transferring that from the blade 203, to the second stop 205, to the plate 202, and then to the rotatable shaft 201.

Moving gas or liquid can also be directed into the concave side of the first arc-shaped blade 203 in the open configuration by a second arc-shaped blade 213 in a closed configuration, which is located just to the left of the first blade 203. The closed configuration is created when the blade 213 has pivoted against a first stop 204, which can be caused by the force of moving gas or liquid pressing against the convex side of the blade 213. One function of a blade 213 in a closed configuration is to direct moving gas or liquid (indicated by arrows) with its convex side into the concave side of blade 203 in the open configuration. When the blade 213 is in a closed configuration, and is located approximately seventy degrees to the left of the blade 203 when it is in the open configuration, the backside of the second blade 213 can form a funnel capable of directing moving wind or liquid into the blade 203 in the open configuration. The convex side of this second blade 213 can deflect gas or liquid down its length and into the concave side of a first blade 203 in the open configuration thereby increasing the efficiency of the vertical-axis turbine 200 by increasing the amount of force collected by blade 203.

For convenience of reference, FIG. 2 individually identifies four of the stops: stop A, stop B, stop C, and stop D. Stop B is located clockwise to stop A, that is B is located along a substantially circular clockwise path to stop A. Stop C is located clockwise to stop B, and stop D is located clockwise to stop C. Stop B is located between stop A and stop C along the clockwise path, and stop C is located between stop B and stop D along the clockwise path. The distance between each of the stops can remain constant or can vary. A first hinge 230 pivotally connects the first blade 203 to the plate 202. A pivotal connection allows the first blade 203 to swing freely in either direction along an axis defined by the first hinge 230. The first blade 203 falls between stop C and stop D, that is a portion of the first blade 203 will always be located between stop C and stop D, even though it is possible that a point on the first blade 203 may not always be located between stop C and stop D (e.g., the outermost tip of the first blade 203 may not always be technically between these two stops). The first blade 203 has freedom of movement between stop C and stop D, that the first blade 203 can swing towards stop C using its pivotal connection until a part of the first blade 203 touches stop C, preventing the first blade 203 from moving in that direction any further. The first blade 203 can also swing in the other direction (towards stop D) using its pivotal connection until a part of the first blade 203 touches stop D, preventing the first blade 203 from moving in that direction any further. A second hinge 231 pivotally connects the second blade 213 to the plate 202, allowing the second blade 213 to swing freely in either direction along an axis defined by the second hinge 231. The second blade 213 falls between stops A and B and has freedom of movement between stop A and stop B.

The second function of a blade 223 in the closed configuration is to minimize drag. When the blade 223 is located approximately opposite the position where blades pivot into the open configuration, the pivoting motion allows the outer end of the blade 223 to swing in toward the center 201 of the turbine 200. This decreases the amount of surface area exposed to moving gas or liquid, which can contact the blade 223 thereby reducing the amount of drag created by such contact. Additionally, the arc shape of the blade 223 further decreases this surface area by allowing the blade 223 to wrap around the plate 202. This creates favorable aerodynamics reducing the force transferred from the gas or liquid particles that are still able to contact the blade 223.

Figure 3:
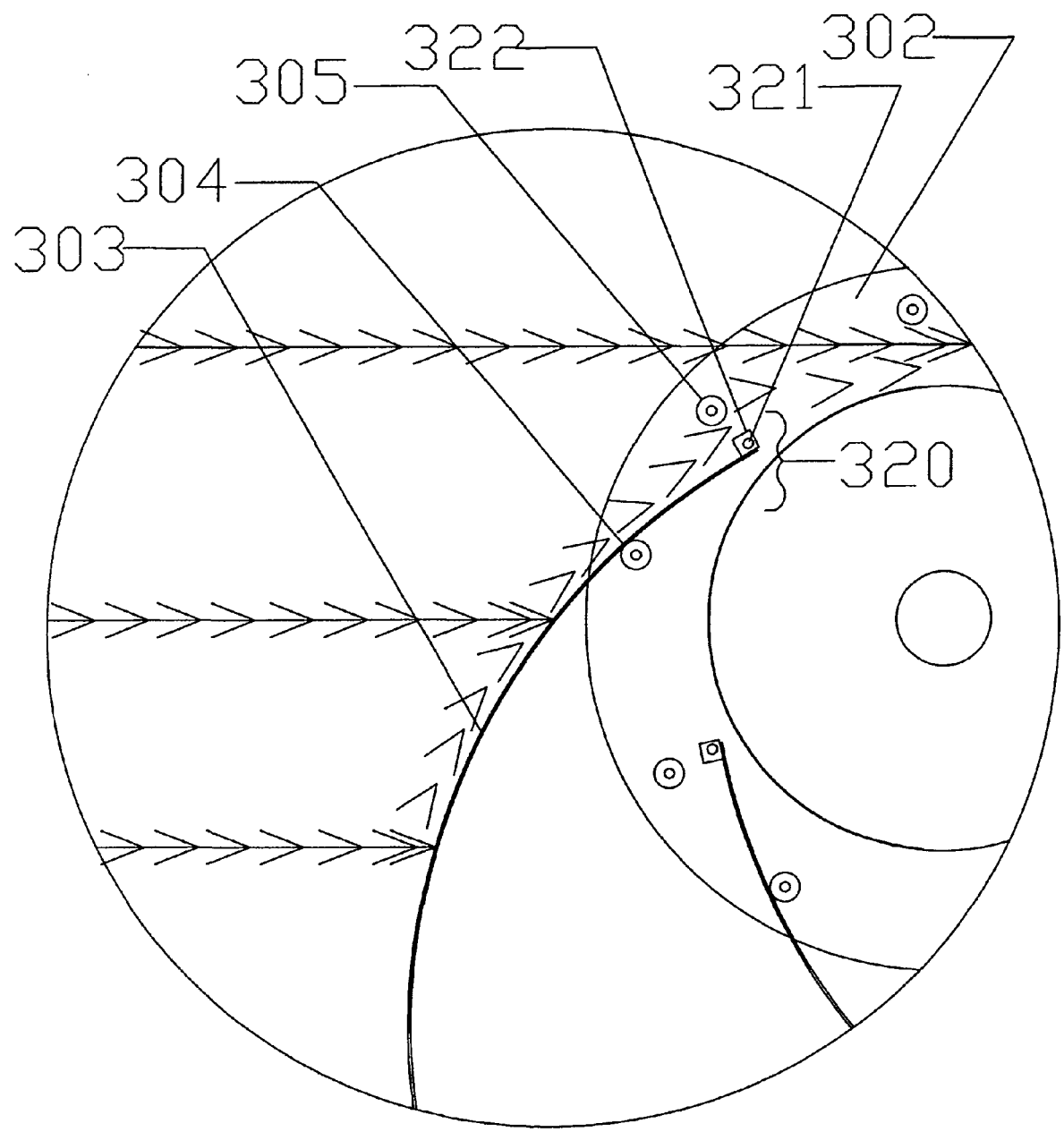
FIG. 3 is a magnified top, cut-away view of the hinge mechanism of a vertical-axis turbine wherein the motion of gas or liquid is indicated by arrows, according to an embodiment.

FIG. 3 is a magnified top, cut-away view of the hinge mechanism of a vertical-axis turbine wherein the motion of gas or liquid is indicated by arrows, according to an embodiment.

The pivotal attachment of each arc-shaped blade 303 can be created by a hinge 320. Each hinge 320 can be created by a pin 321 having a first end and a second end. The first end of the pin 321 can be connected to the first plate 302 and the second end of the pin 321 can be connected to the second plate (not pictured). The arc-shaped blade 303 can be comprised of one or more loops 322 along one of its sides. Each loop 322 can be capable of accepting a pin 321 and moving freely about that pin 321 thereby forming a hinge 320. The hinge 320 can allow the blade 303 to pivot in a plane perpendicular to pin 321 and parallel to the first plate 302 and the second plate (not pictured). This pivot motion is restrained only by the first stop 304 and the second stop 305 located on either side of the blade 303.

Figure 4:
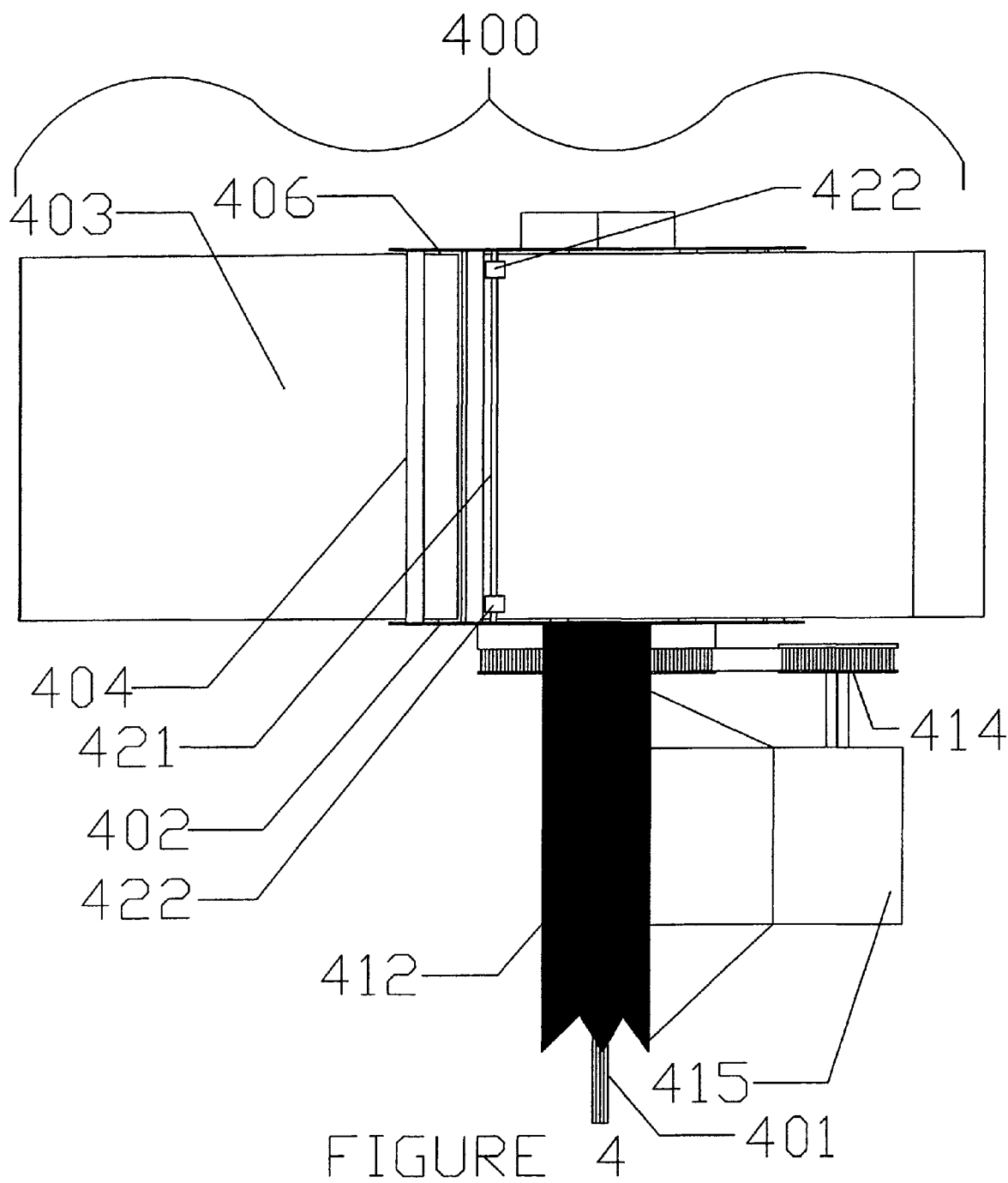
FIG. 4 is a front view of a vertical-axis turbine, according to an embodiment.

FIG. 4 is a front view of a vertical-axis turbine 400, according to an embodiment.

In this view, the pin 421 and the loops 422 which create the hinge can be seen more clearly. Also, the first stop 404 is shown next to the blade 403 in the open configuration. Likewise, the first plate 402 and the second plate 406 and their relative positions within the turbine 400 can also be seen. This view also shows how the turbine can be mounted atop a pole 412 and how power can be transferred from the turbine 400, thru the rotating shaft 401, to a generator 415 by a pulley system 414. The rotating shaft 401 in this configuration can also be used to actuate other mechanical systems, such as a pump, either concurrently with its actuation of the generator 415 or as an alternative use of the power created by the turbine 400. In an alternative embodiment, a drive pulley can be attached directly to the first plate 402 or the second plate 406 and this pulley can be used to drive a generator 415 or other mechanical device (not pictured).

Figure 5:
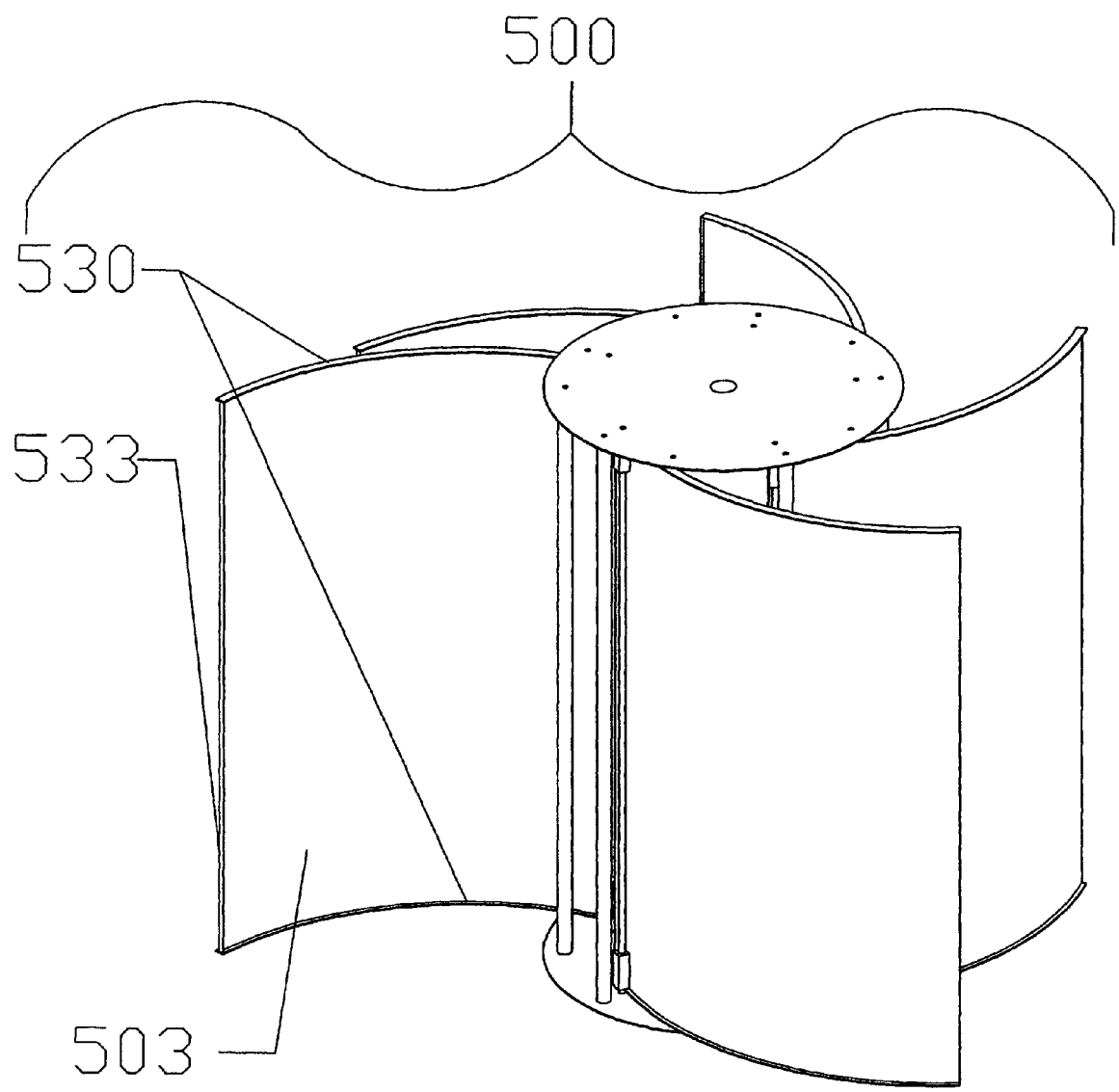
FIG. 5 is an isometric view of a vertical-axis turbine, according to an embodiment.

FIG. 5 is an isometric view of a vertical-axis turbine 500, according to an embodiment.

In order to add rigidity and strength to each of the arc-shaped blades 503 comprising the vertical-axis turbine 500, one or more edges of each blade 503 can also comprise a thin strip 530 of suitable material attached perpendicular to the blade 503. At the outside edge 533 of the blade 503, the strip 530 can be aligned so as to form a raised ledge on the concave side of the blade 503. This strip 530 on the outside edge 533 can increase the amount of force captured by the blade 503 in an open configuration. This strip 530 on the outside edge 533 can be flush with the convex side of blade 503 so as not to increase drag in the closed configuration.

Figure 6:
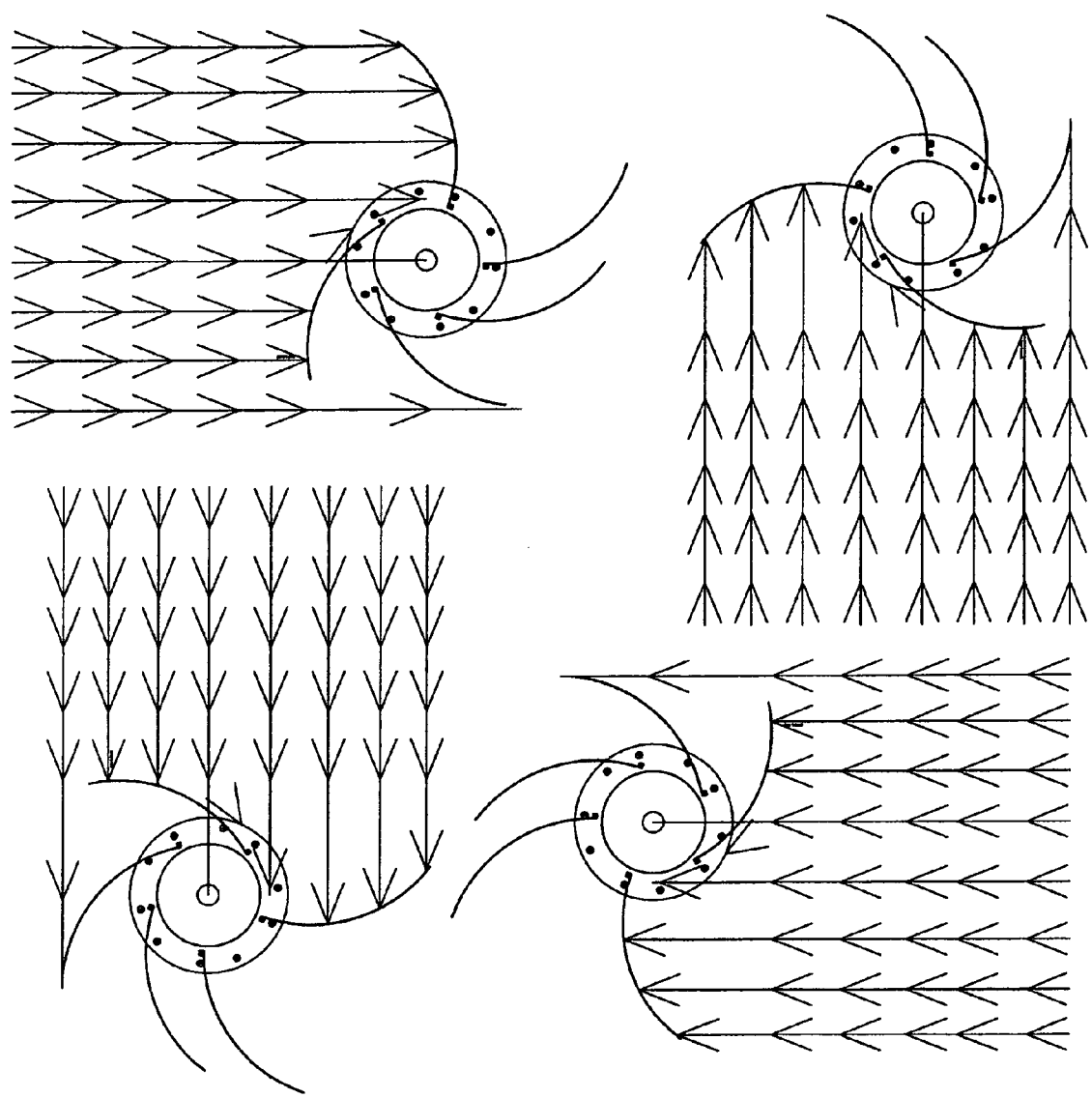
FIG. 6 is a top, cut-away view of four vertical-axis turbines wherein the motion of gas or liquid is indicated by arrows, according to an embodiment.

FIG. 6 is a top, cut-away view of four vertical-axis turbines wherein the motion of gas or liquid is indicated by arrows, according to an embodiment.

The vertical-axis turbine can capture the force of flowing gas or liquid from any direction as the location of the blade in an open configuration can be any position along the diameter of the turbine. The blade position roughly ninety (90) degrees to the right of the direction of gas or liquid flow will become the blade in the open configuration capable of capturing the force of said gas or liquid flow. The turbines depicted in this figure are each configured to rotate clockwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Figure 7:
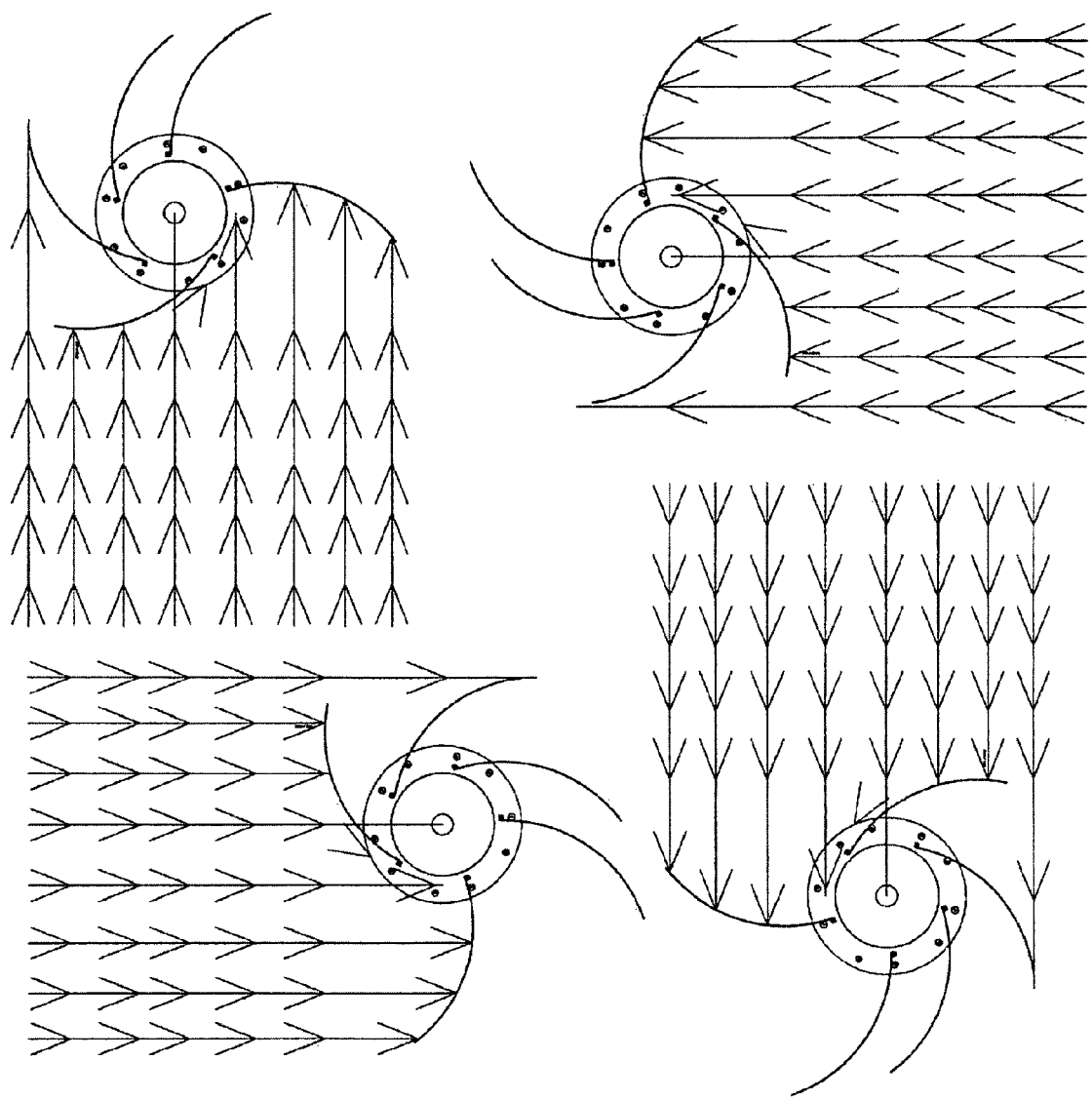
FIG. 7 is a top, cut-away view of four vertical-axis turbines wherein the motion of gas or liquid is indicated by arrows, according to an embodiment.

FIG. 7 is a top, cut-away view of four vertical-axis turbines wherein the motion of gas or liquid is indicated by arrows, according to an embodiment.

The turbines depicted in this figure are each configured to rotate counter-clockwise.

What is claimed is:

1. A turbine, comprising:
   a plate connected to a rotatable shaft, the plate rotating along with the shaft;
   a first blade comprising a concave side and an opposite convex side, wherein the thickness of the first blade is no greater than five percent of the length of the first blade and the camber of the first blade is no less than fifteen percent;
   a first hinge pivotally connecting the first blade to the plate;

a second blade comprising a concave side and an opposite convex side, wherein the thickness of the second blade is no greater than five percent of the length of the second blade and the camber of the second blade is no less than fifteen percent;

a second hinge pivotally connecting the second blade to the plate;

a stop A connected to the plate;

a stop B connected to the plate located clockwise on the plate to the stop A;

a stop C attached to the plate located clockwise on the plate to the stop B, wherein the stop B is located between the stop a and the stop C; and a stop D attached to the plate located clockwise on the plate to stop C, wherein the stop C is located between the stop B and the stop D;

wherein the first blade falls between the stop A and the stop B and has freedom of movement between the stop A and the stop B; and wherein the second blade falls between the stop C and the stop D and has freedom of movement between the stop C and the stop D.

2. The turbine as recited in claim 1, wherein each stop is made from a pin connected to the plate.

3. The turbine as recited in claim 1, wherein each stop comprises a shock absorbing sleeve.

4. The turbine as recited in claim 1, wherein the rotatable shaft is capable of actuating one or more electrical generators, water pumps, or other mechanical devices capable of being actuated by a rotatable shaft.

5. The turbine as recited in claim 1, wherein the turbine comprises a tube-shaped center.

6. The turbine as recited in claim 1, wherein the turbine comprises as second plate connected to the rotatable shaft, the second plate rotating along with the shaft and is pivotally connected to the first blade and is pivotally connected to the second blade.

7. The turbine as recited in claim 1, wherein one or more edges of each blade comprises a thin strip of material connected perpendicularly to each blade to increase strength and rigidity.

8. The turbine as recited in claim 7, wherein the thin strip of material is aligned so as to form a raised ledge on the concave side of the blade to increase an amount of force captured by the blade from moving gas or liquid.

9. The turbine as recited in claim 8, wherein a strip on the outside edge is flush with the convex side of each respective blade to minimize drag.

10. The turbine as recited in claim 1, wherein the first hinge is closer on the plate to the stop B than the stop A; and wherein the second hinge is closer on the plate to the stop D than the stop C.

11. The turbine as recited in claim 10, wherein when gas or liquid comes into contact with the turbine the gas or liquid causes the plate to rotate, and causes the first blade to alternate between touching the stop A and the stop B depending on a rotational position of the plate and a direction of the gas or liquid, and the gas or liquid causes the second blade to alternate between touching the stop C and the stop D depending on the rotational position of the plate and the direction of the gas or liquid.

12. The turbine as recited in claim 11, wherein when the first blade is touching the stop A and the second blade is touching the stop D, liquid or gas passing along the convex side of the first blade is directed by the convex side of the first blade to the concave side of the second blade.

13. The turbine as recited in claim 11, wherein the first blade is touching the stop B and the second blade is touching the stop C, liquid or gas passing alone the convex side of the first blade is directed by the convex side of the first blade into the concave side of the second blade.

14. A method to operate a turbine, the method comprising:
Providing a turbine comprising:
A plate attached to a rotatable shaft;
A first blade comprising a concave side and an opposite convex side, wherein the thickness of the first blade is no greater than five percent of the length of the first blade and the camber of the first blade is no less than fifteen percent;
A first hinge pivotally connecting the first blade to the plate;
A second blade comprising a concave side and an opposite convex side, wherein the thickness of the second blade is no greater than five percent of the length of the second blade and the camber of the second blade is no less than fifteen percent;
A second hinge pivotally connecting the second blade of the plate;
A stop A attached to the plate;
A stop B attached to the plate located clockwise on the plate to the stop B, wherein the stop B is located between the stop A and the stop C; and
A stop D attached to the plate located clockwise on the plate to the stop C, wherein the stop C is located between the stop B and the stop D;
Receiving a liquid or gas by the turbine causing the plate to rotate, wherein the first blade falls between the stop A and the stop B and has freedom of movement between the stop A and the stop B and wherein the second blade falls between the stop C and the stop D and has freedom of movement between the stop C and the stop D, and wherein the first hinge is closer to the stop B than the stop A, and wherein the second hinge is closer to the stop D than the stop C,
Wherein when a gas or liquid comes into contact with the turbine the gas or liquid causes the plate to rotate, and causes the first blade to alternate between touching the stop A and the stop B depending on a rotational position of the plate and the direction of the gas or liquid, and the gas or liquid causes the second blade to alternate between touching the stop C and the stop D depending on the rotational position of the plate and the direction of the gas or liquid.

15. The turbine as recited in claim 14, wherein when the first blade is touching the stop A and the second blade is touching the stop D, liquid or gas passing along the convex side of the first blade is directed by the convex side of the first blade into the concave side of the second blade.

16. The turbine as recited in claim 14, wherein when the first blade is touching the stop B and the second blade is touching the stop C, liquid or gas passing along the convex side of the first blade is directed by the convex side of the first blade into the concave side of the second blade.

* * * * *